UNITED STATES PATENT OFFICE.

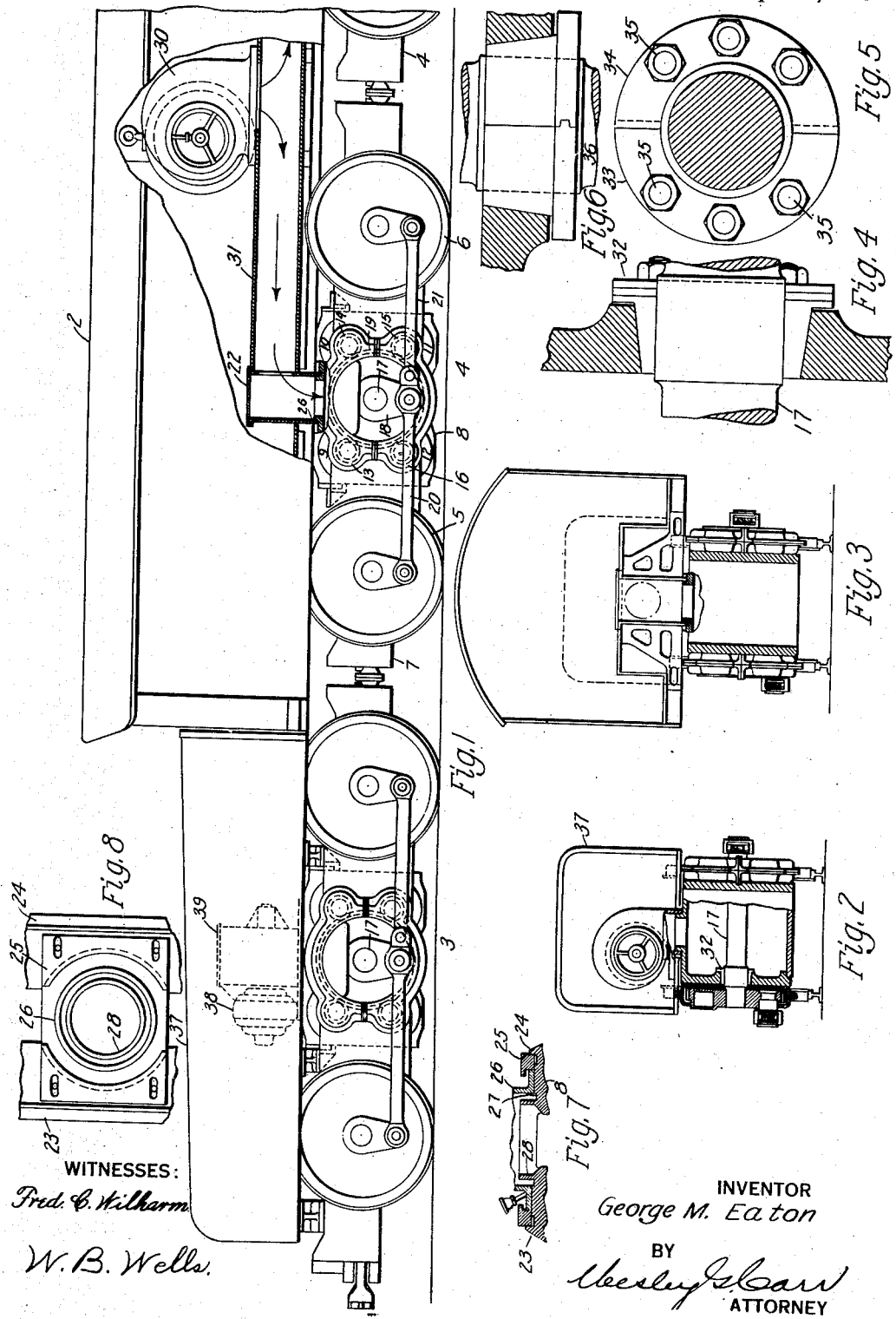

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

LOCOMOTIVE CONSTRUCTION.

1,300,254.          Specification of Letters Patent.      Patented Apr. 15, 1919.

Application filed January 10, 1917. Serial No. 141,619.

*To all whom it may concern:*

Be it known that I, GEORGE M. EATON, a citizen of the United States, and a resident of Pittsburgh, in the county of Allegheny and State of Pennsylvania, have invented a new and useful Improvement in Locomotive Construction, of which the following is a specification.

My invention relates to locomotives and particularly to electric locomotives having forced ventilation of the motors contained therein.

One object of my invention is to provide a locomotive with a truck having a motor frame mounted thereon which shall form a portion of the side frames of the truck and a portion of the pivotal connection between the truck and the cab of the locomotive.

Another object of my invention is to provide a locomotive of the above-indicated character which shall have a pivotal connection formed between the motor frame mounted on a truck and a body bolster mounted on the cab of the locomotive, and means for transmitting ventilating fluid directly from the cab to the motor frame through the pivotal connection between the cab and the truck.

Another object of my invention is to provide a locomotive of the above-indicated character which shall have jack-shaft bearings mounted in the motor frames contained therein and means for removing the bearings from within the motor frames.

Another object of my invention is to provide a locomotive which shall have a plurality of articulated trucks pivotally connected to the cab thereof, a motor frame mounted on each of said trucks and forming a portion of the pivotal connection between the cab and the truck, and means whereby one of said pivotal connections will permit limited longitudinal movement between the truck associated therewith and the cab.

A further object of my invention is to provide a locomotive having a motor frame which shall form a portion of the truck side frames and a support for the jack-shaft bearings and shall have an opening in the top thereof for the admission of ventilating fluid to the motors and for permitting the jack-shaft bearings to be repaired and renewed.

In the accompanying drawing illustrating my invention, Figure 1 is a side elevational view of a portion of a locomotive constructed in accordance with my invention; Fig. 2 is a sectional view of the outer truck illustrated in Fig. 1; Fig. 3 is a sectional view of one of the inner trucks illustrated in Fig. 1; Figs. 4, 5 and 6 are detail views of a jack-shaft bearing for the locomotive illustrated in Fig. 1; Fig. 7 is a sectional view of one of the pivotal connections between the cab and one of the trucks; and Fig. 8 is a plan view of one of the pivotal connections between the cab and a truck.

Referring to the drawing, a locomotive 1 embodies a cab 2 and four articulated running gears, two only of which, 3 and 4, are illustrated in Fig. 1 of the drawing. The two trucks which are not illustrated are similar in construction to the trucks 3 and 4, with one exception, namely, that one of the trucks which is pivotally connected to the cab 2 is provided with means whereby a limited relative movement is permitted between the cab and the truck. The pivotal connection which permits a relative movement between the truck associated therewith and the cab will be described in connection with Fig. 8 of the drawing.

The truck 4 is pivotally connected to the cab 2 and embodies two pairs of driving wheels 5 and 6, side frames 7 which are mounted on the axles of the driving wheels 5 and 6, and a motor frame 8 which is constructed as an integral part of the side frames 7. Four motors 9, 10, 11 and 12 are contained within the motor frame 8 and are, respectively, provided with pinions 13, 14, 15 and 16 which are mounted on the armature shafts thereof. A jack shaft 17, which is provided with crank disks 18 and with gear wheels 19 which mesh with the pinions 13, 14, 15 and 16 of the motors 9, 10, 11 and 12, is mounted on the motor frame 8.

The top portion of the motor frame 8 is so constructed as to form a pivotal connection with a body bolster 22 which is mounted on the cab 2 and to permit ventilating air to be supplied to the motors through the pivotal connection. Two projections 23 and 24, as illustrated in Fig. 7 of the drawing, are formed on the top portion of the motor frame 8 between which is disposed a plate 25 that may be bolted to the motor frame and is provided with a circular opening therethrough. The body bolster 22 is provided with a cylindrical projection 26 which is disposed within the circular opening in the plate 25 and rests upon the motor frame 8, as illustrated in Fig. 7 of the drawing. An annular groove 27 and a cylindrical projection 28 are formed on the motor frame 8, whereby the motors may be protected from the lubricating material which is supplied to the bearing surfaces between the top portion of the frame 8 and the cylindrical projection 26 on the body bolster 22. In the pivotal connection between the inner truck 4, not illustrated, and the cab 2, the plate 25 is not in contact with the two projections 23 and 24 of the motor frame and, therefore, permits a limited amount of relative longitudinal movement between the cab and the truck. Fig. 8 of the drawing is a plan view of the above-mentioned pivotal connection. In the latter case cited, the plate 25 is not securely bolted to the motor frame. The bearing surfaces between the truck bolster 22 and the frame 8 are preferably lubricated by means of grease cups which are carried by the body bolster, and a sufficient amount of the weight of the cab is carried by these bearing surfaces to establish a fluid seal therebetween, for a purpose to be described later. A blower 30, which is mounted on the cab 2, is connected to the body bolster 22 by means of a fluid conduit 31.

The jack shaft 17 is supported on the frame 8 by means of bearings 32 which are provided with frusto-conical seats in the motor frame 8. Each of the bearings 32 is provided with two bearing brasses 33 and 34 which completely surround the jack shaft 17 and are forced into position in the frusto-conical seats by means of bolts 35. The bearings are also provided with a splined connection 36 to prevent any relative longitudinal movement between the brasses. Whenever it is desired to repair or renew the bearing brasses 33 and 34, access to the same is obtained through the pivotal connection in the top portion of the motor frame.

The truck 3 is similar in construction to the pivotal truck 4 and is provided with an end hood 37 which is directly mounted thereon. Within the hood 37 are mounted a blower 38 and a blower 39 which are connected to the opening in the top portion of the motor frame mounted on the truck 3, as is illustrated in Fig. 2 of the drawing.

Variations in the structure and arrangement and location of parts may be made without departing from the spirit and scope of my invention, and such modifications are intended to be covered by the appended claims.

I claim as my invention:

1. In a locomotive, a truck including a motor frame constituting a part of the truck frame, of a cab pivotally mounted on said motor frame, and means for directly conveying ventilating air from said cab to the motor frame.

2. In a locomotive, a truck having a plurality of driving wheels, a plurality of motors having an integral frame, said motor frame constituting a part of the truck frame, and a jack shaft mounted in said motor frame and connected to said motors, a portion of said motor frame forming a pivotal connection between the truck and the cab.

3. In a locomotive, the combination with a truck including a motor frame constituting a part of the truck frame, of a cab pivotally connected to the motor frame, a body bolster mounted on said cab, and means for joining the motor frame directly to said body bolster and for transmitting ventilating fluid directly from the body bolster to the motor frame.

4. In a locomotive, the combination with a pivotal truck, a motor, a motor frame constituting a part of the truck frame and a cab having a body bolster, of means for conducting ventilating fluid from said cab to the motor, said means solely embodying the motor frame and said body bolster.

5. In a locomotive, the combination with a cab and a plurality of trucks, a portion of said trucks being pivotally connected to said cab, of a plurality of motors, a motor frame comprising a part of each of said pivotal trucks and forming a portion of the pivotal connection between the truck associated therewith and the cab, and a jack shaft mounted in each motor frame and connected to the associated motors.

6. In a locomotive, a truck, a motor frame mounted on said truck, and a cab having a body bolster mounted on said frame, said body bolster and said frame forming a pivotal connection which permits a limited relative longitudinal movement between the cab and the truck.

7. In a locomotive, the combination with a motor frame, a jack shaft and jack-shaft-bearing brasses having frusto-conical seats in said frame, of means whereby said bearing brasses may be removed and replaced from the inside of said motor frame.

8. In a locomotive, the combination with a motor frame, a jack shaft and jack-shaft-bearing brasses having frusto-conical seats in said frame, of means for permitting the removal and replacement of said bearing brasses from the inside of said motor frame when the jack shaft is in position.

9. In a locomotive, the combination with a motor frame, a jack shaft and jack-shaft-bearing brasses having frusto-conical seats in said frame, of means operated from within said frame for pressing said bearing brasses into the frusto-conical seats, and means for alining said bearing brasses relative to each other.

10. In a locomotive, the combination with a motor frame, a jack shaft, and jack-shaft-bearing brasses having frusto-conical seats in said frame, each bearing being provided with two bearing brasses which completely surround the jack shaft when in position, of means for securing said bearing brasses to the motor frame and for permitting the removal and replacement of the same from within the frame.

11. In a locomotive, the combination with a truck having two pairs of driving wheels, a plurality of motors and a frame for supporting said motors on the truck, of a jack shaft having bearing brasses mounted in said motor frame, means for conducting ventilating fluid from the cab directly to the motor frame, and means whereby said bearing brasses may be removed and replaced through said ventilating conducting means.

12. In a locomotive, the combination with a truck, a motor having a frame mounted on said truck, a jack shaft having bearing brasses mounted in said motor frame, and a cab mounted on said truck, of means for effecting a forced ventilation of said motor, and means for obtaining access to said bearing brasses through said ventilating means.

13. In a locomotive, a truck having a plurality of driving wheels, a plurality of motors having a single frame located between two pairs of said driving wheels, frusto-conical seats in said frame for supporting jack-shaft bearings, and a jack shaft mounted in said bearings and connected to said motors.

14. In a locomotive, the combination with a truck having two pairs of driving wheels, and a plurality of motors having a single frame located between said pairs of wheels, of a jack shaft connected to said motors and the driving wheels, and bearing brasses for said jack shaft, said bearing brasses mounted in frusto-conical shaped seats in said motor frame.

15. In a locomotive, the combination with a plurality of motors, a unitary frame for supporting said motors on the truck, and a cab mounted on said truck, of a body bolster mounted on said cab above said motor frame, and a pivotal connection formed by said motor frame and said body bolster between the truck and the cab.

16. In a locomotive, the combination with a truck, a plurality of motors, a frame for supporting said motors on the truck, and a cab mounted on said truck, of a body bolster mounted on said cab above said motor frame, a pivotal connection formed by said motor frame and said body bolster between the trucks and the cab, and means for supplying ventilating fluid to the motors through said pivotal connection.

17. In a locomotive, the combination with a truck, a plurality of motors, a frame for supporting said motors on the truck, and a cab mounted on said truck, of a body bolster mounted on said cab above said frame, a pivotal connection formed by said motor frame and said body bolster between the truck and the cab, and means for lubricating the bearing surfaces between said frame and said body bolster and for protecting the motors from the lubricating means.

18. In a locomotive, the combination with a cab and two trucks connected thereto, of motor frames mounted on said trucks and forming pivotal connections between said trucks and the cab, and means for permitting a limited longitudinal movement of one of said trucks relative to the cab.

19. In a locomotive, the combination with a cab, two articulated trucks connected thereto, a plurality of motors having a unitary frame mounted on each of said trucks, and a body bolster mounted on said cab adjacent to each of said motor frames, of means comprising said motor frames and said body bolster for effecting a pivotal connection between the cab and said trucks, one of said pivotal connections permitting a limited relative movement between the truck associated therewith and the cab.

20. In a locomotive, the combination with a truck and a cab mounted thereon, of a plurality of motors having a unitary frame rigidly mounted on said truck and effecting a pivotal connection between the cab and the truck, and means for effecting a circulation of ventilating fluid between the cab and the motor frame through said pivotal connection.

21. In a locomotive, the combination with a cab, and four articulated trucks, of a plurality of propelling motors mounted on each of said trucks, a unitary frame for the motors of each of said trucks, and means comprising two of said motor frames, for effecting pivotal connections between two of the trucks and said cab.

22. In a locomotive, the combination with a cab and four articulated trucks, of a plurality of propelling motors mounted on each of said trucks, a unitary frame for the motors of each of said trucks, means comprising two of said motor frames, for effecting pivotal connections between two of the trucks and said cab, and means for supplying ventilating air through the pivotal connection to the motors on the pivotal trucks.

In testimony whereof, I have hereunto subscribed my name this 27th day of Dec., 1916.

GEORGE M. EATON.